United States Patent [19]
Folger et al.

[11] Patent Number: 5,337,044
[45] Date of Patent: Aug. 9, 1994

[54] SYSTEM FOR REMOTE COMPUTER CONTROL USING MESSAGE BROADCASTING SYSTEM

[75] Inventors: David Folger; David Arnold, both of Mountain View; Maureen Lambert, Moss Beach, all of Calif.

[73] Assignee: Nomadic Systems, Inc., Mountain View, Calif.

[21] Appl. No.: 772,915

[22] Filed: Oct. 8, 1991

[51] Int. Cl.$^5$ .............................................. H04Q 7/00
[52] U.S. Cl. ............................. 340/825.44; 340/311.1; 364/413.02
[58] Field of Search ................ 340/825.44, 825.47, 340/825.48, 311.1; 370/90, 93, 96; 364/413.02

[56] References Cited

U.S. PATENT DOCUMENTS

| | | | |
|---|---|---|---|
| 4,225,918 | 9/1980 | Beadle et al. | 364/200 |
| 4,449,536 | 5/1984 | Weaver | 128/696 |
| 4,503,510 | 3/1985 | Weaver | 364/715 |
| 4,644,351 | 2/1987 | Zabarsky et al. | 340/825.44 |
| 4,700,374 | 10/1987 | Bini | 379/60 |
| 4,731,814 | 3/1988 | Becker et al. | 379/62 |
| 4,783,654 | 11/1988 | Ichikawa | 340/825.44 |
| 4,797,122 | 5/1988 | Bhagat et al. | 340/825.44 |
| 4,811,383 | 3/1989 | Hashimoto | 379/76 |
| 4,845,491 | 7/1989 | Fascenda et al. | 340/825.44 |
| 4,862,167 | 8/1989 | Copeland, III | 341/107 |
| 4,868,562 | 9/1989 | Andros et al. | 340/825.44 |
| 4,868,860 | 9/1989 | Andros et al. | 379/57 |
| 4,875,039 | 10/1989 | Andros et al. | 340/825.44 |
| 4,878,051 | 10/1989 | Andros et al. | 340/825.44 |
| 4,942,598 | 7/1990 | Davis | 379/57 |
| 4,951,043 | 8/1990 | Minami | 340/825.44 |
| 5,043,721 | 8/1991 | May | 340/825.44 |
| 5,153,827 | 10/1992 | Coutré et al. | 364/413.02 |

FOREIGN PATENT DOCUMENTS

| | | | |
|---|---|---|---|
| 9013213 | 11/1990 | World Int. Prop. O. | 340/825.44 |
| 9111889 | 8/1991 | World Int. Prop. O. | 340/825.44 |

Primary Examiner—Donald J. Yusko
Assistant Examiner—John E. Giust
Attorney, Agent, or Firm—Townsend and Townsend Khourie and Crew

[57] ABSTRACT

A system for remote control of a mobile computer system from a base computer system, where the base system generates control command tokens which are broadcast over a pager system. A communicator including a pager receiver, which is normally in a standby state, is connected to the mobile computer, which is normally in an off state, and receives the command tokens. Stored in both the base computer and the mobile computer is a table of commands, cross-referenced with the command tokens. The command tokens are used to instruct the mobile computer to take a variety of actions, including telephoning the base computer, informing the base computer of the mobile computer's location, exchanging file update information and application version information, and other actions requiring communication between the base station and the remote station. The communicator includes a local CPU and SRAM, and powers up the mobile computer as necessary. Certain commands and information exchange may be carried out by the local CPU without powering up the mobile computer.

14 Claims, 2 Drawing Sheets

SYSTEM FOR REMOTE COMPUTER CONTROL USING MESSAGE BROADCASTING SYSTEM

BACKGROUND OF THE INVENTION

Use of portable computers has increased significantly over the last few years as technology has overcome many of the previous barriers of performance and affordability, and the clear advantages of mobile computing have crossed the threshold from fantasy to reality. Yet, as laptop, notebook and palmtop computers (and other manifestations of mobile computing) have become more commonplace, certain problems have arisen with regard to communication with these mobile computers.

Despite the significant increase in the use of mobile computers, it seems unlikely that desktop computers will disappear any time soon, given their inherent advantages, including greater storage, performance and display capabilities, not to mention superior connectivity and expansion flexibility.

Thus, the need for communication between mobile computers and those residing in offices and other fixed locations (as well as among mobile computers themselves) is likely to increase dramatically as remote computing becomes an accepted, if not necessary, manner of conducting business.

Yet, as a user of a single desktop computer in an office environment begins to rely on a laptop computer while traveling or at home, new problems are created, for example, by the existence of multiple versions of a file on different computers. Keeping track of which file is most current is itself a formidable task, not to mention the numerous problems inherent in maintaining two file systems, such as locating a particular file which is not stored on both systems.

Resolving these difficult problems requires, at a minimum, some method of communication (e.g., file transfer) between the two computers. Ideally, the mobile computer user desires that this communication be as seamless as possible—i.e., as if the user had taken the desktop computer on the road (complete with its high-speed link to the office network). Thus, factors such as unattended operation and automatic initiation of communications become quite important to the highly mobile computer user. Also important is the ability to execute distributed applications, which permit the remote user to take advantage of many of the benefits offered by the desktop computing environment, such as increased storage capacity and higher performance.

Moreover, it is becoming increasingly important for users of mobile computers not only to initiate communications with other computers (whether mobile or in a fixed location), but also to be on the receiving end of such communications—e.g., to receive information, such as stock quotes, on a periodic basis or to be notified that a particular file has been modified. It is therefore not surprising that new methods of communication between computers, particularly wireless communication (e.g., cellular modems), are also increasing in popularity, because such systems enable the mobile user in an unknown location to receive communications.

Yet, in the face of these trends (toward increasing use of mobile computers and emerging methods of communication among such computers) lies significant obstacles—low bandwidth, coupled with low information transfer rate. As opposed to the high-speed local area networks now inundating office environments, a relatively low-speed modem (e.g., 9600 baud) is often the fastest means of communication available to users of mobile computers. The limited amount of information which can be transferred in a given period of time is often the most significant bottleneck inhibiting the performance of useful tasks in a mobile computing environment.

Moreover, these limitations are not likely to disappear in the near future, if ever. As new methods of transferring information among computers are developed for the office environment (and among fixed locations using extremely high-speed links), the need for additional bandwidth is constantly increasing. It is thus likely that the performance and bandwidth available for remote communications with mobile computers will continue to lag behind that found in the office environment.

Yet, numerous methods of communicating with mobile computers exist today, albeit with limited utility. On one end of the spectrum lie physical file transfer methods, such as the use of floppy disks to transport files to and from a mobile computer system. Such an approach is inherently inflexible in that the user must either determine in advance which files are to be transferred or be subject to a significant period of delay while a diskette is sent by mail or some other method of transportation.

Perhaps the most common communication medium is the standard phone line, with modems on each end for converting the analog telephone signals to the digital format accepted by today's computers. Though modems are among the fastest (and highest bandwidth) methods of communicating with remote computers, they lack significant flexibility in that they are tied to a phone line and thus a fixed location—contrary to the very essence of mobile computing.

Cellular modems, on the other hand, enable the remote user in an unknown location to receive communications at unpredictable intervals, as well as to initiate communications from virtually any location. Such modems, however, currently present significant problems of reliability and extremely limited battery life, making the "continuous standby mode" (i.e., waiting for a call) impractical.

Some of these problems could be resolved by the use of pager technology (though, as discussed below, paging systems are currently used solely for the transmission of data to a person, not to a computer). Pager receivers can be left in continuous standby mode for a sufficiently long period of time to enable the remote user to recharge the batteries overnight or during some other conveniently long period of nonuse. Moreover, pager receivers, due to the use of satellite technology, are significantly more reliable than cellular modems and can receive communications from virtually any location.

Paging systems are, however, currently a one-way medium and thus cannot initiate communications. Sending a page from a computer requires a telephone call via either a standard or a cellular modem.

More significantly, however, paging systems suffer from severe bandwidth limitations. It is simply impractical to send more than a short message via existing paging systems. It is thus not surprising that paging systems have been limited to the transmission of data (e.g., a phone number or a short alphanumeric message) intended to be displayed to the remote user on an LCD or other screen in the pager receiver. Though increasing in popularity, even new applications for paging systems, including stock quotes and electronic mail, are limited to the transmission of data intended for human recipients, as opposed to commands sent to control a remote computer.

Thus, of the various available communication media, standard modems remain the primary form of communication with remote computers. Due to the limitations discussed above, typical uses involve dialing into an office computer (e.g., a network communication server) and initiating file transfers or remote operation of an office computer and/or network.

In addition to the problems noted above with respect to communication media, there is also a dearth of sophisticated communication software tailored to the needs of the mobile computer user. Even software which allows for "remote control" of another computer or network requires that the remote user initiate the communication. In order to automate the process of initiating communication with a mobile computer, one would either have to know the location of the remote computer (thus restricting the remote user's flexibility) or use a wireless link, such as a cellular modem (generally impractical in light of the limitations discussed above).

What is needed therefore is a mobile computer communication system which can be placed in a continuous standby mode without unduly restrictive battery life limitations. Such a system would allow for the manual or automated transmission of commands to the remote computer, preferably without human intervention. Because such a system would necessarily be subject to the low bandwidth limitations discussed above, the commands would likely be short in nature, though they could be sufficiently extensible to permit the subsequent use of higher bandwidth media to implement sufficiently complex commands requiring the communication of significant amounts of information.

SUMMARY OF THE INVENTION

The present system solves the problems inherent in prior systems through the use of pager technology and the generalized use of "command tokens" for system control and communication between a base station and a mobile processor. These command tokens are distinguishable from mere data which is sent via existing pager systems and which is intended to be perceived by a human recipient (i.e., read on an LCD or other display device).

Instead, the command tokens are recognized (via a "codebook," e.g., a lookup table of command tokens stored in memory) and implemented by the mobile processor or the "communicator" device connected to or integrated with the pager receiver. Such a system permits the base station to maintain automated control of and communication with the mobile processor, independent of its actual location. Human intervention, though optional, is generally not required to send, receive, recognize and implement a command via the paging system.

The base station might be a desktop computer, perhaps connected to a local area network. It might instead be merely a person with access to a telephone to initiate a page and transfer a command token. The mobile processor might typically be a laptop computer, though it could be a more application-dependent device, such as a remote weather station or other device capable of processing commands.

The communicator provides the means for receiving the command token (via the pager receiver) and possibly implementing certain commands itself as well as preprocessing particular commands, for example, by turning on various peripheral devices, such as a cellular modem or the mobile processor.

In this system, the mobile processor is connected to a pager receiver which is normally in a standby state, and which is slightly modified to permit the incoming message (command token) to be processed and optionally transmitted to the mobile processor. The base station is connected to a telephone and/or modem (standard or cellular) used to initiate a page to the pager receiver. The base station may at any time send command tokens via a standard paging network to the mobile processor, including a command to power up from an off state.

Systems presently in use are capable of sending limited amounts of data to users of pager receivers. However, heretofore there has been no system available for control of a remote processor through commands sent from a base station via a paging system, as in the present invention. Sophisticated control of remote computers is currently thought to be impractical using low bandwidth media such as existing paging networks.

By working within the low bandwidth limitations inherent in today's paging systems, this system functions with minimal battery life restrictions and maintains a continuous standby state. To accomplish the formidable task of controlling a mobile processor from a base station (or, conversely, enabling the mobile processor to issue commands to control the base station), this system employs relatively small command tokens which can be transmitted automatically from the base station and recognized by the mobile processor via a codebook identifying the domain of command tokens. Sufficiently complex tasks might require that the mobile processor initiate communication with the base station over a higher bandwidth channel (e.g., a cellular modem) permitting the transfer of significant amounts of information.

Command tokens sent by the base station of this invention may also direct the remote processor to establish standard or cellular modem communication with the base station, so that data or other files may be transferred. Other categories of commands include file version maintenance and updating, time-of-day synchronization, file management, mobile location requests, program control, file backup and archiving, information retrieval, reliability/error checking, security, notification of events such as file modifications, and instructions to be carried out by the mobile computer at a later time (e.g., printing a document). Embodiments utilizing these and other capabilities are set forth in the description below.

DESCRIPTION OF THE PREFERRED EMBODIMENTS

Figure 1:
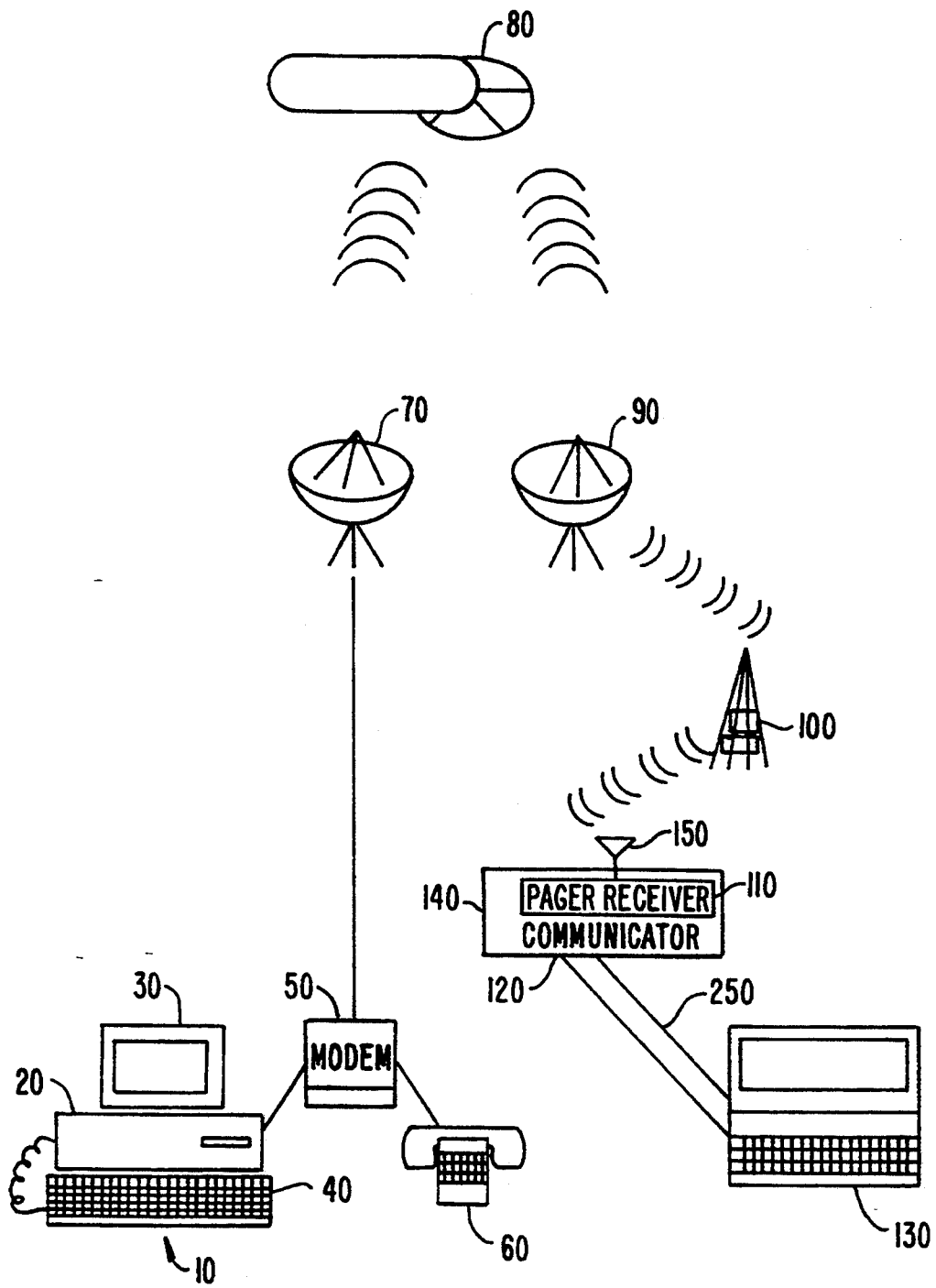
FIG. 1 is a system diagram showing the use of the present invention enabling communication via a paging system between a base station (desktop computer) and a mobile processor (laptop).

FIG. 1 shows a system implementing the present invention, including a base station or desktop computer 10, a CPU 20, a monitor 30 and a keyboard 40. (The monitor and keyboard are not crucial to the invention, but will be present in a typical application.) The computer 10 is connected in a conventional manner to a modem 50, which may optionally also be connected to a telephone 60.

The modem (which can either be a standard or a cellular modem) communicates with a conventional telephone system, and in particular a telephone system which is capable of sending pager messages from a broadcast station 70 in a standard fashion. Typically, pager systems will broadcast over a broad range via a satellite 80.

Signals from the satellite 80 are downlinked to a receiving station 90, which typically communicates the signals to a standard FM radio station 100. Conventional pager systems presently then rebroadcast the signal from the radio station 100 in a narrow bandwidth signal over, for instance, a 57 kHz subcarrier of an assigned FM radio frequency.

The particular implementation of the standard paging network (which preferably involves a direct broadcast without the intervention of a satellite or commercial radio broadcast station, and uses digital frequencies or frequencies other than a modulated FM signal) is not essential to this invention, provided that the paging signal can be initiated from the base station (e.g., via standard telephone lines and/or an existing cellular network) and received by the pager receiver connected to the mobile processor.

Figure 2:
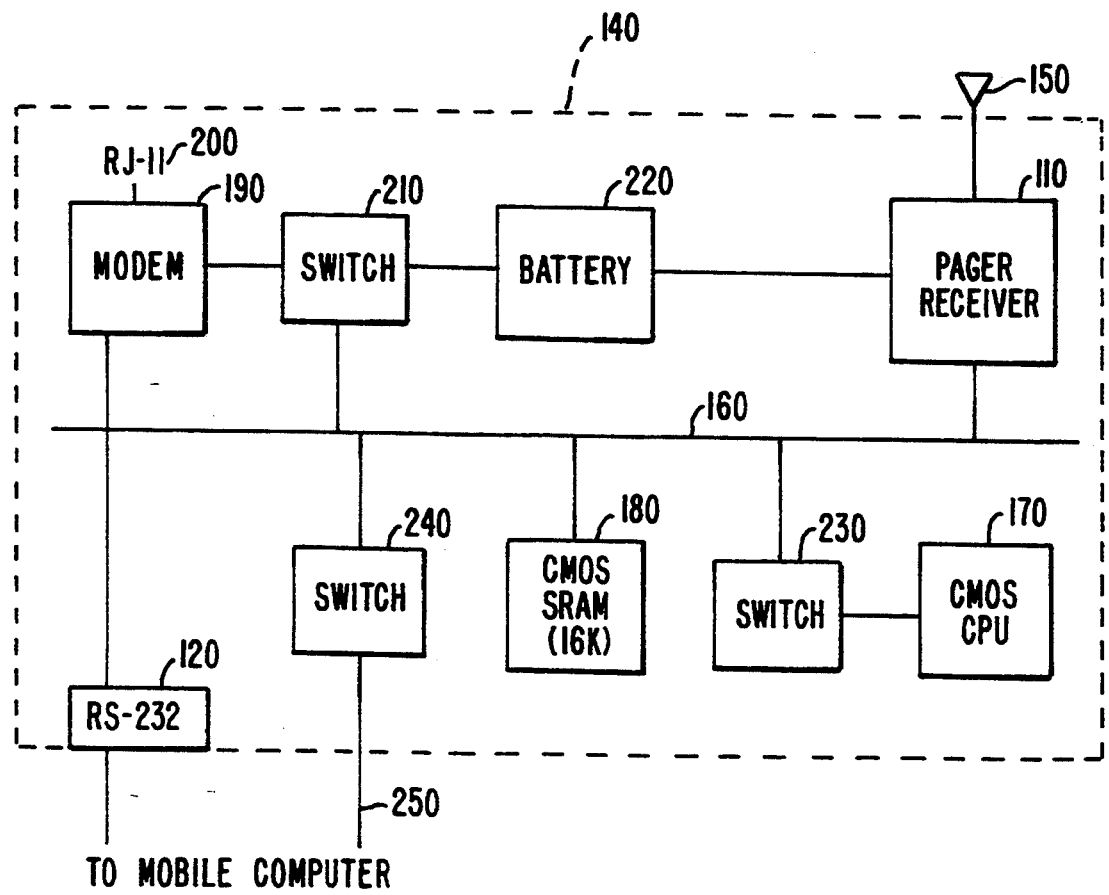
FIG. 2 is a functional block diagram showing details of the communicator of the present system, including a pager receiver, a local CMOS CPU and SRAM, and a modem, all of which are external to the mobile processor (connected via a standard RS-232 serial link).

This signal is received by pagers in the area, such as a pager receiver 110, which forms part of a communicator 140 (see FIGS. 1 and 2). The pager receiver 110, which may be any one of a number of conventional pager receivers, including those with alphanumeric displays and internal memories, is slightly modified in this embodiment (by any of a variety of means well known in the art) to permit the incoming information (which might otherwise be displayed, for example, on a small liquid crystal display) to be transferred within communicator 140 from the pager receiver 110 onto a local bus 160 for further processing, e.g., by CMOS CPU 170 (as shown in FIG. 2).

Although the communicator 140 is shown as a separate unit in the embodiment illustrated in FIG. 2, coupled to the remote computer 130 via a standard RS-232 serial link, it may instead be integrally connected to the remote computer, either on the motherboard itself or in a standard expansion slot. Similarly, the pager receiver 110 may be a separate, self-contained unit having a standard RS-232 connection to the communicator 140 and/or remote computer 130, or it too may be integrated into the remote computer.

It will be appreciated that the base computer 10 and remote computer 130 are conventional computers running known operating systems.

With the above-described system, a user of a computer is now able to control a remote, mobile computer by means of a base computer system. This control involves three stages: (1) the initiation of commands from the base system; (2) the communication of those commands from the base system to the mobile system; and (3) the implementation of the commands by the mobile system. These stages are discussed in detail in the following description.

INITIATION OF COMMANDS

A command may be issued by the computer 10 in any of a number of ways. For example, in other embodiments, the base station could be merely a telephone operated by someone who sends a command token by making a phone call and issuing a page using standard techniques, such as typing an alphanumeric message using the telephone keypad.

In the preferred embodiment illustrated in FIGS. 1 and 2, it is possible that the user of the computer 10 directly instructs that computer to send a predefined command token. For example, the user may run an application dedicated to the sending of selectable, predefined command tokens. Such an application can easily be written using well-known software programming techniques and the system of the present invention. Alternatively, a software developer may customize virtually any existing application to add this command token feature.

Most likely, however, the computer 10 will directly issue the command token in response to the indirect actions of the user. Unlike the form of communication with remote systems which predominates today, in which users of such systems typically query the base computer to transfer a file, this embodiment takes the form of software in the base station which automatically initiates communication with the remote computer 130, for example, to determine if certain files have been modified and to update related files automatically.

Conversely, the remote computer 130 can recognize the need for assistance from the base computer 10, and initiate the communication itself to issue a command token request via a higher bandwidth medium, such as standard or cellular modem 190. In response to receiving this request, the base computer 10 processes the request locally and, rather than continually occupy the cellular modem, calls back the remote computer 130 at a later time via the paging receiver 110 in response to the request.

In any event, much or all of this communication preferably occurs in the background without any intervention of a person, who might be working on the base computer 10, the mobile computer 130 or on neither. This system permits software developers, using any of a variety of well-known programming techniques, to modify their software to send command tokens to mobile computer 130 under certain desired conditions.

In a preferred embodiment, the base computer 10 periodically pages the remote computer 130 to download a current directory of certain files previously designated by the user to be of particular importance. Such files might, for instance, be related, linked spreadsheets for a large project on which the user is currently working. The spreadsheet software may be adapted in accordance with this invention to provide the user with the option of designating certain linked spreadsheet files to be updated, and the frequency at which the updates should take place (e.g., every hour), regardless of whether one or more of these files (or the most recent version of such files) exists only on the base computer 10 or the mobile computer 130.

In this situation, the base computer 10 queries the mobile computer 130 every hour by issuing a page (as described below) and sending a command token which instructs the mobile computer to call back via a higher bandwidth link (such as modem 190) and exchange a directory indicating the most recent modification times for the predesignated files. The base computer 10 then determines whether any of such files have been modified on the mobile computer during the past hour. If so, it transfers such files from the mobile computer, updates them in accordance with standard linked spreadsheet software (which might result in further modifications to such files) and then transfers the updated files back to remote computer 130. The higher bandwidth link may then be terminated.

In another use of the invention, the system makes periodic transfers between base computer 10 and mobile computer 130 of the current directory of predesignated files (to keep the two computers updated with the most recent directory of files). When the user working, for example, on the base computer 10 attempts to load a file whose most recent version is not present on that system (e.g., because the user most recently modified that file on mobile computer 130), the base computer 10 automatically pages remote computer 130 and issues a command token requesting that such file be transferred. In response to this request (on the low bandwidth paging system, impractical for file transfers), the mobile computer 130 initiates a call via modem 190, issuing a command token which invokes the file transfer process.

In this example, all such communication between base computer 10 and mobile computer 130 occurs without interaction of the user except indirectly by virtue of attempting to load a file which happened not to be present on the user's base computer. All maintenance of the directory of predesignated files and transfer of the most recent version occurred in the background without the user's participation. In this respect, the difficult task of maintaining two different file systems is handled automatically by distributed software in each system and the communication mechanism illustrated in FIGS. 1 and 2.

Further examples of commands and command categories which can be utilized in accordance with this invention are provided in greater detail below. Numerous possibilities exist. The software itself, as noted above, can easily be implemented using well-known programming techniques to initiate the sending of command tokens under predefined conditions via the paging or modem mechanisms illustrated in FIGS. 1 and 2.

These mechanisms for transferring command tokens are discussed below.

COMMUNICATION OF COMMANDS

Consider the situation in which base computer 10 determines that a particular command should be sent to mobile computer 130. The base computer searches its memory for the appropriate command token associated with the desired task. A codebook or directory of command tokens is maintained in the memories of both the base computer 10 and the mobile computer 130. A subset of the codebook is preferably maintained in SRAM 180 for use by communicator 140 in implementing certain commands not requiring the assistance of the mobile computer 130.

Upon selecting the appropriate command token from the codebook in its memory, the CPU 20 of the base computer 10 then initiates the page via modem 50 using standard communication software techniques (i.e., dialing the number of the pager receiver 110 attached to mobile computer 130).

The pager 110 receives the signal via an antenna 150. The signal or command token issued by base computer 10 is automatically placed on a local bus 160 within the communicator 140.

The communicator also includes a CMOS CPU 170 coupled to bus 160, as well as a static RAM memory (SRAM) 180. The CMOS CPU may be left on continuously (as it draws relatively little power) or may, for example, be switched on and off via switch 230 (coupled to bus 160) upon receipt of a page, indicated, for example, by a signal from pager receiver 110 to switch 230 via bus 160.

A battery 220 powers the communicator 140 and keeps the pager receiver in an active standby mode. A switch 210 is provided for on/off switching of a conventional modem 190, which is also connected to bus 160 and which, as noted above, may be either a standard (e.g., 9600 baud) modem connected to a telephone line via an RJ-11 jack 200 or a cellular modem. This switch 210 can be activated either by the local CMOS CPU 170 in communicator 140 or by the external mobile computer 130 via RS-232 serial link 120 and local bus 160. The SRAM 180 may be used to buffer the commands, data, file update information or other information transmitted to the communicator 140, and may additionally serve as scratch memory for the CMOS CPU 170.

A command token which is received by the communicator 140 represents a command or sequence of commands which are sent over the bus 160 to the CPU 170, which then executes the software necessary to decode or interpret the command token (using well-known software programming techniques). Many different tokens representing a wide variety of commands and command sequences may be employed, as discussed further below.

The mobile computer 130 may be left constantly on, or may be in an off state, awaiting commands received by the pager receiver 110 which require the attention of the mobile computer. When mobile computer 130 is in the off state, thereby conserving battery life, the communicator 140 is of particular advantage.

The communicator 140 is always left in a standby state, ready to receive any command tokens originating From the base computer 10, and is maintained in this state by the battery 220. (Alternatively, conventional adaptors For an external power source—not separately shown—may also be provided, such as a 12-volt adaptor for automobiles or boats, or an AC adaptor for household current. These adaptors may both power the communicator 140 and recharge the battery 220.)

The CPU 170 interprets the command represented by the command token, and determines whether it is necessary to power up the remote computer 130 in order to implement that command. As discussed below, certain functions can be handled entirely by the local CPU 170 of the communicator 140, without the use of the mobile computer 130. Other functions will require that the (typically more powerful) mobile computer 130 be accessed.

If the remote computer 130 is in its off state, and it becomes necessary to access that computer to implement the commands requested by the user of the base computer 10, then the communicator 140 powers on the mobile computer 130 via switch 240 which connects, via a dedicated line 250 (see FIG. 1), the communicator 140 and the mobile computer 130. The conditions under which the communicator will power on the mobile computer 130 may be inherent in the semantics of the command token itself, or may be determined by logic within the software running on CMOS CPU 170.

In either case, once the mobile computer 130 is powered on, the CMOS CPU 170 may send it the command token via the standard RS-232 serial link 120. Software in the mobile computer then identifies the command token (utilizing the codebook stored in memory, e.g., a standard lookup table of command tokens) and implements the predetermined functions associated with that command token. The last function in the command token is preferably a "power down" command to mobile computer 130, and may be generated locally within the computer 130 or from within the communicator 140, upon receiving an indication that the functions associated with the command token have been performed. Alternatively, a conditional "power down" command can be sent to the second processor which instructs the second processor to turn off, but only when the battery power of the second processor is low. Another command can be sent to which instructs the second processor to communicate the power status of the battery to the first processor, so that the first processor can arrange and send multiple commands such that higher priority commands get sent and executed first. Yet another command is a command to save volatile data into nonvolatile memory.

An important application of this invention involves the use of commands requiring that the communicator 140 dial a telephone number via the modem 190. The communicator can, for example, establish a conventional (higher bandwidth) telecommunication link with the base system 10 to receive further instructions. Such further instructions may include, for example, commands to the remote computer 130 to update particular files and exchange other information. This is particularly useful when the remote user must have access to files which are frequently modified.

The instructions to the remote computer may also include information and commands necessary to upgrade applications stored in the SRAM 180 of the mobile computer 130. Thus, the mobile computer can be provided automatically with the latest versions of programs and software to which the base system has access (including the most recent version of the codebook and associated software to implement newly added commands).

IMPLEMENTATION OF COMMANDS

As discussed above, both the base computer 10 and the mobile computer 130 (and to some extent, the CMOS CPU 170 and SRAM 180 within communicator 140) can issue and interpret commands resulting in the performance of complex as well as simple functions. Commands requiring additional bandwidth, such as file transfers, may ultimately result in the initiation of modem or other communications; whereas relatively simple commands will be invoked solely by the transmission of command tokens across existing paging networks.

Using the system of the invention, this use of existing low bandwidth paging systems to issue commands (represented by relatively small command tokens) to a mobile computer, can be implemented using well-known hardware and software techniques. The preferred mechanism for transmitting the command tokens across existing pager networks is illustrated in FIGS. 1 and 2.

The preferred means for generating and interpreting the command tokens is discussed in greater detail below, though the actual software implementation of any given command is straightforward and easily implemented by skilled programmers (and thus not illustrated herein).

For example, one common command in this embodiment involves a request to the mobile computer 130 asking for its location, i.e., a standard or cellular phone number, and for the mobile computer to call back the base computer 10 using, for example, the modem 190.

Software implementation of this command involves a command token entry (i.e., any binary/alphanumeric representation of the command) in the codebook or lookup table of the memories of both the base computer 10 and the mobile computer 130. Such tables of commands are quite common and easy to implement.

This embodiment includes general purpose software for locating command token entries in the codebook and sending command tokens, and decoding incoming command tokens using the codebook. The issuance and interpretation of table-based commands is also quite common and is found, for example, in almost every operating system which must issue and interpret requests (commands) from applications programs utilizing its services. Such command language interface software techniques are well known in the computer programming art.

Finally, the software routines which actually implement the particular functions represented by each command token will vary widely, depending upon the particular command. The example mentioned above, involving a request to call back the base computer 10 and send the location of the mobile computer 130, is straightforward to implement. The location may take the form of, for instance, a telephone number which has been typed in by the user.

Upon recognizing the command token, the software in the mobile computer 130 invokes a routine (e.g., using standard software interrupt techniques) which accesses the mobile computer's phone number (previously stored in a known physical or virtual location in memory) and initiates a phone call to the base computer 10 via modem 190 (using standard communication software techniques). Once connected to the base computer, standard communication software is utilized to transfer the data or additional command tokens.

More complex commands might be more difficult to implement, though such difficulty lies not in the implementation of this invention, but rather in the particular complexity of the task sought to be performed. Examples of commands likely to be utilized in a preferred embodiment of this invention are discussed below.

Command sequences to the remote computer 130 may include instructions: to delete files (which does not require establishment of communication via the modem 190); to receive new files via the modem 190; to inform the base computer 10 of any modifications to particular files; and to back up files from the remote computer 130 to the base computer 10 (e.g., files which the remote user has modified, and to which the base computer user needs access). When modifications to a file are sent, only the "delta" or actual changes in the file need be transmitted, rather that re-sending the entire file. This delta may be included in the command token itself, or the command token may cause the mobile computer to contact the base system to receive deltas.

Other commands issued by the base computer 10 will not require that the remote computer 130 be powered up, but rather can be implemented entirely by the CPU 170 within the communicator 140. For example, as mentioned above, a command may be issued by the base computer 10 requesting that the mobile computer call back with information regarding its location. The location may take the form of a standard or cellular telephone number, or an address on a wireless LAN or e-mail system, or any other information necessary to allow the base computer 10 to locate and communicate with or leave messages for the remote computer 130.

The base computer 10 may itself notify the mobile computer of the base computer's location, the information being included in the command token, in a coded or encrypted format for which the mobile computer is provided with the decoding information (such as in the lookup table discussed above).

To inform the base computer of the remote computer's location, or to implement other commands which do not require transmission of large amounts of data (such as is necessary in the transfer or update of files), the communicator 140 dials the base computer's modem 50 via the remote modem 190, and sends the requested data, which may be stored in SRAM 180.

The remote computer can thus periodically and automatically be instructed to communicate such information as its location and local telephone number to the base station, without any human intervention. (If the modem does not have an auto-answer feature and communication software to permit unattended operation, however, then human intervention may be necessary.)

Once the base computer 10 learns the current telephone number of the remote computer 130, it can then use that number to establish a link via the telephone system as necessary, without further need for sending tokens via the pager receiver 110. However, as soon as the remote computer 130 is moved, the base computer 10 then again must issue commands via the pager command system of the invention to contact and control the remote computer.

The base computer 10 may additionally issue synchronization signals, to ensure that the remote computer and the base computer agree on the clock time, which can be important for periodic updates of information. This function also can be implemented entirely by the communicator 140, without powering up the remote computer 130. When it is next necessary to power up the remote computer 130, any update information received by the communicator 140 (which may be stored, for example, in SRAM 180) can then be transmitted to the memory of the computer 130.

Command tokens sent to the remote computer may also include instructions to execute particular applications locally, and to send the results back to the base computer 10. A command token may instruct the remote computer 130 to locate a particular object, compilation of data, file or the like, and, if it is found, to send it to the base station 10. These commands will typically require that the mobile computer 130 be powered on, either immediately or at a later, predetermined time.

In a preferred embodiment of the invention, security and/or encryption data are included in one or more of the command tokens, for maintaining secrecy of data and to restrict access to the mobile computer to only preapproved base station users.

The command tokens of the invention may also be used for error or reliability checks. For instance, a command token may be sent periodically to the remote computer 130 including a code indicating how many file updates the remote computer should have received to date, the versions of particular documents which the remote computer should have stored in memory, the amount and type of data or files the remote user should have received in a given time period, and so on. These reliability checks may be carried out locally by the communicator 140.

If any of this information does not agree with the information which the mobile computer or the communicator has stored in local memory, the communicator 140 can issue a command to establish communication with the base station 10 and to retrieve the missed information, update, etc. It is also preferable that the command tokens include self-contained error checks, such as bits indicating the length of the command token or other conventional error-checking means.

Another potential embodiment of this invention involves the control of and access to remote information or data gathering stations. For instance, unmanned weather stations may be placed in remote locations, and the present invention can be used to power up the remote computer and instruct it to transmit data collected in a given period of time. This can be arranged to be accomplished automatically, so that all data can be gathered without any need for human intervention.

Given the above teaching, one skilled in the pertinent art will be able to develop numerous variations which may be implemented in software at both the base station and the mobile computer 130 (as well as the CMOS CPU 170 within the communicator 140), without departing from the spirit and scope of this invention.

What is claimed is:

1. A method for communication between a first processor and a second processor using a broadcast paging system, the method comprising the steps of:

sending a command message from the first processor to said broadcast paging system addressed to the second processor, where said command message includes a identification field identifying the second processor and an instruction to the second processor to open a bi-directional channel between the first processor and the second processor;

receiving said command message from said first processor by said broadcast paging system, wherein said broadcast paging system is configured to broadcast multiple command messages from multiple first processors addressed to multiple second processors within a broadcast region;

unidirectionally broadcasting said command message from said broadcast paging system over said broadcast region to the second processor;

receiving said command message at the second processor when the second processor is within said broadcast region; and initializing said bi-directional channel, using the second processor, when said command message is received by the second processor, thereby opening a bi-directional communication session between the first processor and the second processor.

2. The method of claims 1, wherein said bi-directional channel is a high-bandwidth modem channel, communication between the first processor and said broadcast paging system is at a lower bandwidth relative to said bi-directional channel, and said bi-directional communication session is a high-bandwidth, bi-directional communication session between the first processor and the second processor and is independent of said broadcast paging system.

3. A method for communication between a first processor and a second processor, comprising the steps of:

sending a command message from the first processor to a message broadcast system addressed to the second processor, where said command message includes a identification field identifying the second processor and an instruction to the second processor to open a bi-directional channel between the first processor and the second processor;

receiving said command message from said first processor by said message broadcast system, wherein said message broadcast system is configured to broadcast multiple command messages from multiple first processors addressed to multiple second processors within a broadcast region;

unidirectionally broadcasting said command message from said message broadcast system over said broadcast region to the second process;

receiving said command message at the second processor when the second processor is within said broadcast region; and initializing said bi-directional channel, when said command message instructing said second processor to open bi-directional channel is received by the second processor, thereby opening a bi-directional communication session between the first processor and the second processor.

4. The method of claim 3, further comprising the step of passing an address of the second processor to the first processor over said bi-directional channel once said bi-directional channel is initiated.

5. The method of claim 4, wherein said address of the second processor is a telephone number.

6. The method of claim 4, wherein said address of the second processor is a network node address.

7. The method of claim 3, further comprising the step of passing status information about the second processor to the first processor over said bi-directional channel once said bi-directional channel is initiated.

8. The method of claim 3, further comprising the step of passing communication control parameters from the second processor to the first processor over said bi-directional channel once said bi-directional channel is initiated.

9. The method of claim 3, wherein the first processor communicates with said message broadcast system over a low-bandwidth broadcast pager channel.

10. The method of claim 3, wherein said bi-directional channel is a high-bandwidth modem channel, and said bi-directional communication session is a high-bandwidth bi-directional communication session between the first processor and the second processor.

11. The method of claim 3, wherein said command message comprises a plurality of control commands, the method further comprising the step of prioritizing said plurality of control commands according to a predetermined priority when the second processor indicates a low power status of a battery powering the second processor.

12. The method of claim 3, wherein said command message comprises an instruction to the second processor to return status data indicating a location of the second processor.

13. The method of claim 12, wherein said location of the second processor comprises a telephone number of a telephone to which a modem is coupled, said modem also coupled to the second processor.

14. The method of claim 3, wherein said command message is a command selected from a command set containing at least six commands which instruct the second processor to return to the first processor (1) an indication of a battery power level, (2) an indication of an amount of available storage capacity in the second processor, (3) information relating to a directory on a disk in the second processor, (5) an indication of whether a file is in use by the second processor, and (6) an indication of whether the second processor is in use, respectively.

* * * * *